UNITED STATES PATENT OFFICE 2,536,983

BIOCIDAL COMPOSITION

Emily M. Owen, Easton, Pa., assignor to General Aniline & Film Corporation, New York, N. Y., a corporation of Delaware No Drawing. Application November 8, 1946, Serial No. 708,800

3 Claims. (Cl. 167—30)

The present invention relates to an improved organic bactericidal, fungicidal and insecticidal composition, hereinafter sometimes referred to as a biocidal composition, for preventing or arresting the infestation of pestiferous insects, fungi and bacteria in organic matter of both plant and animal origin, either in the natural or fabricated state, which composition comprises a carrier containing as an essential active ingredient a resin obtained by the reaction of aromatic primary or secondary amines with formaldehyde and dicyandiamide.

It has been found that the resins obtained by condensation of formaldehyde, aromatic amines and dicyandiamide, by condensing of a mixture of the three components or by adding the reactants in any order, possess valuable bactericidal and fungicidal properties and are useful for the prevention and control of a wide variety of infestations of this character.

The primary and secondary aromatic amines which may be employed in producing resins possessing these properties may be represented by the formula:

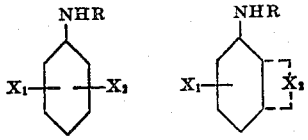

where R equals hydrogen, alkyl (e. g. methyl, ethyl, butyl, lauryl or octadecyl), aryl (e. g. phenyl), and $X_1$ and $X_2$ equal hydrogen, alkyl (methyl, ethyl, butyl, lauryl, octadecyl), aryl (phenyl, tolyl), halogen (bromine, chlorine, fluorine), halogenated alkyl (e. g. trifluoromethyl), alkoxy (e. g. methoxy, ethoxy), aryloxy (e. g. phenoxy), nitro group and the like and where $X_2$ may form a condensed ring system (e. g. quinoline, naphthalene, etc.).

As examples of specific aromatic amines of this type which have been found useful for producing resins possessing bactericidal and fungicidal properties may be mentioned aniline, α-naphthylamine, p-phenylenediamine, 2-toluidine, 3-toluidine, xylidine, alkoxy aromatic amines (e. g. 2-anisidine, 3-anisidine), aryloxy aromatic amines (e. g. 2-phenoxyaniline, 3-phenoxyaniline), aryl aromatic amines (e. g. 2-aminodiphenyl, 3-aminodiphenyl), halogenated aromatic amines (e. g. 2-chloroaniline, 3-chloroaniline, 5-chlorotoluidine, 2,5-dichloroaniline), nitro aromatic amines (e. g. 2-nitroaniline, 3-nitroaniline), aromatic secondary amines such as N-alkyl aromatic amines (e. g. N-ethyl-5-nitrotoluidine, N-methyl-4-nitroaniline), N-aryl aromatic amines (e. g. diphenylamine, 2-nitrodiphenylamine, 2-chlorodiphenylamine) and the like.

As previously mentioned, the bactericidal and fungicidal resins are obtained by condensing aromatic amines of the type heretofore mentioned with dicyandiamide and formaldehyde or an equivalent thereof—for instance, such formaldehyde-yielding substances as trioxymethylene, paraformaldehyde, methylol, etc.

The resins thus obtained by condensing an aromatic amine with dicyandiamide and formaldehyde have, as stated, valuable bactericidal and fungicidal properties and may be mixed with a suitable water-immiscible carrier of the type hereinafter specified in order to produce the bactericidal and fungicidal compositions of the present invention. Either the resins themselves or their salts with various organic or inorganic acids may be employed in the manufacture of the bactericidal and fungicidal compositions of this invention. The amine-formaldehyde-dicyandiamide resins are readily converted to a salt by treatment with an equivalent amount of various acids, such as organic carboxylic and sulphonic acids, naphthenic acids, organic aliphatic acids such as acetic acid, caproic acid, caprylic acid, capric acid, stearic acid and the like; the sulphonated vegetable and animal oils such as sulphonated castor oil and the like, aliphatic sulphonic acids prepared from sulfonyl chloride made by the Reed Process, aromatic carboxylic acids such as p-t-amylbenzoic acid, aromatic sulphonic acids such as naphthalene sulphonic acid and the like, or inorganic acids such as hydrochloric, sulphuric, phosphoric, etc. It has been found that the salts of the amine-formaldehyde-dicyandiamide resins with simpler organic acids and most inorganic acids are somewhat water-soluble. However, in the case of organic acid salts, as the acid becomes more complex (i. e. of higher molecular weight), the water-solubility of the salts decreases. Where water-insolubility is desired, it is preferred to employ the salts of these resins with organic acids having a structure equal to a carbon chain of at least six atoms. In general, the bactericidal or fungicidal effectiveness of the organic aliphatic salts of these resins has been observed to decrease as the length of the chain increases. Likewise, for particular applications, the miscibility of the salts of the resin with particular carriers and their water-solubility differ substantially when the different acids are employed in the formation of the salts. The effects of the various acids in this respect are well known in the art and those skilled therein may readily determine the specific salt which is most desirable for any particular application.

While the thus-obtained resins or their salts possess bactericidal and fungicidal properties, they are not entirely satisfactory for application from a practical standpoint, since it is difficult to obtain uniform distribution of the small quantities which need to be used. At the same time, it has been found that when substantial amounts of these resins are dissolved or dispersed in a water-miscible solvent such as glycol, glycerol, etc., and the mixture diluted with water, the resultant emulsion is unstable and tends to separate in spite of the addition of emulsifying agents, protective colloids and the like. On the other hand, it has been found that these resins may be readily applied and are useful and practical bactericides and fungicides when mixed with a water-immiscible diluent. Thus, aqueous emulsions of these resins in water-immiscible carriers are relatively stable and if separation occurs, redispersion is easily effected by agitation. A wide variety of water-immiscible carriers have been tested and found useful for the production of bactericidal and fungicidal compositions which contain as an essential active ingredient a resin of the type above described. Thus, water-immiscible organic diluents which have been found useful include aliphatic compounds, for example aliphatic hydrocarbons (e. g. gasoline, kerosene, mineral oil, trichloroethylene, petrolatum, paraffin), saturated and unsaturated aliphatic ethers (e. g. β,β'-dichloroethyl ether, butyl vinyl ether), aliphatic acids (e. g. caprylic acid, capric acid, lauric acid, linoleic acid, stearic acid, oleic acid), aromatic compounds such as benzene, toluene, chlorobenzene, nitrobenzene, animal fats, oils, greases and waxes (e. g. fish oils, lanolin, lard, beeswax), vegetable oils, fats and waxes (e. g. castor oil, peanut oil, linseed oil, olive oil, pine oil, cotton seed oil, carnauba wax, cerosin), terpenes (e. g. turpentine, camphor oil), natural resins (e. g. oleoresin), flours such as walnut shell, wheat, redwood, soya bean and cottonseed. The water-immiscible inorganic diluents that may be used include calcium phosphate, zinc stearate, Bancroft clay, kaolin, diatomaceous earth, sulfur, lime, pyrophyllite, talc, bentonite, and the like.

The composition of the amine-formaldehyde-dicyandiamide resin and a water-immiscible carrier may be used in various combinations with such auxiliary materials as spreaders, stickers, emulsifying agents, emulsion stabilizers and other toxicants, for example insecticides such as metallic arsenates, fluosilicates, phenothiazines, organic thiocyanates such as n-dodecyl thiocyanate and butyl carbitol thiocyanate, nicotine, anabasine (neo-nicotine), nornicotine, insecticides derived from terpenes, rotenone and its congeners, hellebore, pyrethrum, isobutyl-undecylenamide, aminomethyl sulfides, and bactericides and fungicides such as sulfur, polysulfides such as lime-sulfur, the chlorinated phenols, aminomethyl sulfides, copper acyl acetonates, copper chelates of beta-keto acids, copper chelates of salicylaldehyde, basic copper carbonate, Burgundy mixture, Bordeaux mixture, the long chain quaternary ammonium halides and derivatives of dithiocarbamic acid such as ferric dimethyl dithiocarbamate. They may be used in the form of aqueous emulsion sprays, dusts, or solutions, dispersed with wetting agents such as the alkali metal or amine salts of oleic acid and the sulfated higher alcohols, acyl taurides, alkyl naphthalene sulfonates, ethylene oxide condensation products with alcohols and phenols, the sulfonated animal and vegetable oils such as sulfonated fish or castor oils or the sulfonated petroleum oils. They may be used in vegetable and mineral oil sprays in which petroleum or vegetable oil glycerides are used as contact agents or active poisons. Various adhesive and sticking materials such as rosin, polyvinyl butyl ether and glue and various other common adjuvants such as lime may be used. Such mixtures as are indicated herein may have particular usefulness in special applications and frequently will give better results than would be anticipated from the killing power or repellent action of each ingredient when used alone.

Thus, the active agents of this invention may be formulated in a wide variety of ways as may be best suited to the control of any particular pest or combination of pests, having in mind the nature of the pests, their particular habitat, feeding habits and their peculiar susceptibilities, if any. Thus, suitable compositions may be prepared with the active agent in a state of composition, sub-division, association with such other materials as have been mentioned, etc., such as may be necessary peculiarly to adapt the active agent to the purpose to be effected.

The following specific examples illustrate the various preferred insecticidal, fungicidal and bactericidal compositions embodied in the present invention and their method of use:

*Example 1*

A mixture of 20 kg. water, 20.5 kg. hydrochloric acid, 18.5 kg. aniline and 20 kg. ice is stirred at a temperature below 10° C. while 15.7 kg. 40% formaldehyde is added over a period of 1 hour. The mixture was stirred at room temperature for 5 hours, then 19 kg. dicyandiamide was added. The mixture was heated to 90–95° C. for 1 hour. The mixture was cooled to about 50° C. by the addition of 20 kg. ice and made alkaline with 31.8 kg. 30% caustic soda solution. After allowing it to settle, the upper layer was removed and the lower layer washed with 110 kg. water. The lower layer was recovered, dried and pulverized. The light yellow-tan powder weighed 34 kg. (93% of the theoretical 36.5 kg.).

A sample (28.8 g.) of caprylic acid was heated to 100–150° C. while being agitated vigorously and 37.8 g. of the condensation product of aniline, formaldehyde and dicyandiamide was gradually added. The viscous solution solidified upon cooling to room temperature. The product was ground to a fine yellow powder. The dry powder dispersed in carbon tetrachloride was tested and found to be effective for the mothproofing of wool.

A mixture of 50 g. of natural or synthetic pine oil, 7.1 g. of an alkylated phenol-ethylene oxide condensation product and 14.3 g. of the caprylic acid salt of the aniline-formaldehyde-dicyandiamide resin was stirred vigorously at room temperature for 12 hours. This mixture was added to 12 liters of water which was vigorously stirred during the addition. (This composition is equivalent to 1 pound of the resin salt per 100 gallons of water.) The product dispersed readily to yield a milky emulsion which tended to separate slightly on standing; however, the material could be readily redispersed.

This mixture was sprayed with an ordinary agricultural spray on the foliage of plants that were known to be adversely affected by various fungi. This composition was found to be especially useful for the control and prevention of apple scab, potato blight and cherry leaf spot and had no noticeable detrimental effect on the foliage or the fruit of plants sprayed.

*Example 2*

Compositions comprising 1% and 10% aniline-formaldehyde-dicyandiamide resin with 99% and 90% diatomaceous earth respectively were dusted on pea and alfalfa seeds which had previously been inoculated with nitrogen-fixing bacteria. The seeds were planted and compared after growth to adult plants. The treated plants showed thriftier growth and more extensive nodule formation than the untreated plants. No evidence of damping-off disease was observed in the plants whose seeds had been treated with the seed disinfectant.

A composition of 50% resin with diatomaceous earth was found to delay the germination of the seeds and the plants which grew were not as thrifty as the controls. It was later found that pyrax was a more suitable diluent than diatomaceous earth for seed disinfectant compositions.

*Example 3*

A mixture of 30 g. of turpentine, 10 g. of diglycol stearate, 20 g. of candelilla wax and 3 g. of aniline - formaldehyde - dicyandiamide resin were heated to 90–100° C. This composition was useful as a leathermold preventative and polish in the form of a paste prepared by addition of this composition to 200 cc. of hot water in a Waring Blendor and the whole mixed for five minutes. On cooling, a smooth, thick paste resulted. The concentration of the resin was 1.3%. When applied to chrome calf leather dyed in the regular manner, and allowed to stand in a moist atmosphere for one month, the following results were obtained: (1) Control—covered with mold on both sides; (2) polish on smooth side—smooth, clean; rough, 90% covered with mold; (3) polish on rough side—smooth, 30% covered; rough, clean; (4) polish on both sides—smooth, 10% covered; rough, 5% covered.

*Example 4*

A mixture of 12.5 g. of Trigamine stearate, 5 g. of beeswax, 35 g. of candelilla wax, 10 g. of turpentine and 3.1 g. of aniline-formaldehyde-dicyandiamide resin were treated as in Example 3. The following results were obtained on the cream: (1) Control—covered with mold on both sides; (2) polish on smooth side—smooth, clean; rough, 20% covered; (3) polish on rough side—smooth, 5% covered; rough, 15% covered; (4) polish on both sides—smooth, no growth; rough, no growth.

*Example 5*

A mixture of 2.2 g. of aniline-formaldehyde-dicyandiamide resin was dissolved in 20 g. of hot diglycol stearate and the solution poured, with good stirring, into 20 g. of hot neat's-foot oil. The resulting cream, containing 5% of the resin, gave the following results on leather similar to that used in Example 4: (1) Control—covered with mold on both sides; (2) polish on smooth side—smooth, 40% covered; rough, 40% covered; (3) polish on rough side—smooth, 10% covered; rough, no growth; (4) polish on both sides—smooth, 20% covered; rough, 30% covered.

*Example 6*

Several compositions of aniline-formaldehyde-dicyandiamide resins in flat white paint were prepared by intimate mixing. The samples consisted of 1%, 2.5% and 5% amounts of resin in the paint. Small wooden strips were painted with these compositions and allowed to dry. Other strips were painted with the original paint to serve as controls. All the strips were then buried in warm, damp, composted soil to encourage the rapid development of molds. At the end of 2 weeks the painted wooden strips were removed from the soil and washed with water. It was observed that the control strips had scaled markedly and had lost a great portion of their paint; the exposed portions of the wood had darkened in color. The strips which had been painted with 1% resin paint composition had scaled very slightly but the strips that had been painted with the compositions having larger amounts of the resin were in almost perfect condition.

The foregoing examples are, as stated, merely illustrative of preferred embodiments of the present invention and various modifications thereof will suggest themselves to those skilled in the art. In particular, it should be understood that a wide variety of compositions embodying an amine-formaldehyde-dicyandiamide resin as an active ingredient may be formulated in the manner previously indicated in this specification.

I claim:

1. A biocidal composition adapted for use in aqueous agricultural sprays comprising a solution having as its base a water immiscible organic liquid biocide carrier, an emulsifying agent therefor and containing dissolved therein as an active essential ingredient a salt with a fatty acid containing at least 6 carbon atoms of a resin obtained by condensing an aromatic amine of the formula:

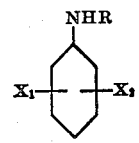

wherein R represents a member of the group consisting of hydrogen, alkyl and aryl and $X_1$ and $X_2$ represent a member of the group consisting of hydrogen, alkyl, aryl, halogen, halo-alkyl, alkoxy, aryloxy and nitro groups; with formaldehyde and dicyandiamide.

2. A biocidal composition adapted for use in aqeous agricultural sprays comprising a solution having as its base a water immiscible organic liquid biocide carrier, an emulsifying agent therefor and containing dissolved therein as an active essential ingredient, a salt with a fatty acid containing at least 6 carbon atoms of a resin obtained by condensing an aromatic amine of the formula:

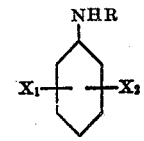

wherein R represents a member of the group consisting of hydrogen, alkyl and aryl and $X_1$ and $X_2$ represent a member of the group consisting of hydrogen, alkyl, aryl, halogen, halo-alkyl, alkoxy, aryloxy and nitro groups; with formaldehyde and reacting the thus obtained amine-formaldehyde reaction product with dicyandiamide.

3. A biocidal composition adapted for use in aqueous agricultural sprays comprising a solution having as its base a water immiscible organic biocide carrier, an emulsifying agent therefor and containing dissolved therein as an active essential ingredient a salt with a fatty acid containing at least 6 carbon atoms of a resin obtained by condensing aniline with formaldehyde and reacting the thus formed aniline-formaldehyde reaction product with dicyandiamide.

EMILY M. OWEN.

REFERENCES CITED

The following references are of record in the file of this patent:

UNITED STATES PATENTS

| Number | Name | Date |
|---|---|---|
| 2,110,943 | Remensnyder | Mar. 15, 1938 |
| 2,222,350 | Keller et al. | Nov. 19, 1946 |
| 2,318,121 | Widmer et al. | May 4, 1943 |
| 2,389,150 | Jayne et al. | Nov. 20, 1945 |
| 2,395,440 | Ainley et al. | Feb. 26, 1946 |

FOREIGN PATENTS

| Number | Country | Date |
|---|---|---|
| 557,558 | Great Britain | Nov. 25, 1943 |